Patented June 27, 1950

2,512,616

UNITED STATES PATENT OFFICE 2,512,616

HEMOSTATIC ALGINIC SURGICAL DRESSINGS

James J. Eberl, Bound Brook, and William L. George, South Bound Brook, N. J., assignors to Johnson & Johnson, a corporation of New Jersey No Drawing. Application January 12, 1946, Serial No. 640,988

2 Claims. (Cl. 167—84)

This invention relates to hemostatic agents or substances which stop bleeding and particularly to hemostatic surgical dressings. It results from our discovery that alginic acid and substances which can be defined as alginic acid-alginates, which are alginic acid partially converted into metallic alginates, have the property of coagulating blood and thus stopping bleeding of wounds and from our discovery that certain forms of the alginic acid and acid-alginates have mechanical and chemical properties rendering them particularly suitable for surgical dressings.

Alginic acid is a complex organic chemical which can be extracted from certain seaweeds by processes which have long been known. Alginic acid and various alginates exist in several physical forms including fibers which can be spun into yarns and woven into cloth. It has also been known that alginic acid could be converted or partially converted into various metallic alginates by ejecting a solution of alginic acid into solutions of the appropriate metallic salts and that these metallic alginates man be reconverted into alginic acid without changing their physical form by treatment with hydrochloric acid under controlled conditions. See for example the British patent to Saranson, 21,586, of 1912; the article by Speakman and Chamberlain in the (British) Journal of the Society of Dyers and Colorists, October 1944, page 264; and the article by Chamberlain, Johnson, and Speakman in the same journal, January 1945, page 137.

We have discovered that alginic acid in the gel, granular and fibrous forms has the property of coagulating blood and thus stopping bleeding when pressed into contact with wounds. The cause of this hemostatic action and the mechanism by which it takes place is not completely understood, but it is believed that the hemoglobin of the blood when in contact with the alginic acid forms a complex which may be either a fibrous mass or a gelatinous or sticky structure, and that when this structure is formed in contact with the surface of a wound, it mechanically prevents the flow of blood from the wound. Whatever the action, we have discovered that when alginic acid is pressed into contact with a wound, even one which is profusely bleeding due to severed arteries, the bleeding is stopped in a few seconds and the alginic acid can be cleanly removed leaving a clean red surface. The hemistatic action is quite fast and the material is much cheaper and easier to use than known hemostatic agents.

We prefer to use fibrous alginic materials and this may be used either in the form of loose wool similar to absorbent cotton or it may be woven into surgical guaze. In these forms it is highly absorbent, rendering it particularly suitable for surgical dressings. In addition alginic acid and various alginic materials are absorbable into the blood stream. Thus a surgical dressing of these materials inadvertently left in the body will do no harm but will be gradually absorbed.

Pure alginic acid, which has a pH of about 2.8, is not as stable as is desired for surgical dressings which must have a long shelf life, that is which must be stable over sufficiently long periods to enable them to be packaged and distributed through the usual channels of trade and kept in condition for use after considerable periods of storage. Accordingly where alginic acid is used, we prefer to stabilize the alginic acid by buffering to a pH not exceeding about 4. This may be done in any known manner, for example by dipping alginic acid fibers or gauze in potassium acid phthalate and subsequently washing.

In this buffering action potassium replaces hydrogen in some but not all of the available carboxyl groups of the long chain alginic acid molecule and forms a new complex which is insoluble in water. Enough hydrogen ions are replaced by the potassium to give the desired pH. At the desired pH not enough hydrogen ions are replaced to convert the alginic acid into a soluble potassium alginate.

We have also found that alginic acid, while commonly regarded as insoluble in water, loses its form when exposed to water at high temperature, for example in the steam sterilizing of surgical dressings. It is obviously necessary to sterilize dressings, and while this may be done in a variety of known ways without steam, the most usual method of sterilizing, both in packaging surgical dressings for distribution and in operating room sterilizing, is exposure to steam, for example at a temperature of about 230° to 240° F. for periods of time as long as 25 or 30 minutes. Such treatment changes the physical form of alginic acid to a degraded, friable material not suitable for a surgical dressing.

We have also discovered that a composition which may be described either as alginic acid which has been partially converted into a water-insoluble metallic alginate or as a water-insoluble metallic alginate which has been partly converted into alginic acid is stable over long periods of time, and even withstands steam sterilizing without appreciable change of its mechanical form or properties and that this material is hemostatic although pure metallic alginates are not hemostatic. Such partly converted alginates are also absorbable in the body. These compositions are not alginic acid nor metallic alginates nor a mixture of the two, but are believed to be a chemically uniform substance formed by substituting metallic ions for some, but not all, of the hydrogen ions in the complex structure of alginic acid. Thus alginic acid may be partly converted, for example, into aluminum, beryllium, calcium, chromium, iron, strontium or zinc alginate or into various compound alginates such as sodium-calcium alginate, potassium-calcium alginate, etc.

Accordingly where a surgical dressing is to be steam sterilized, we may, for example, prepare such material by weaving a gauze of any suitable metallic alginate and partially converting this to alginic acid. For this purpose any metallic alginate is suitable which is not toxic to the human system when applied to wounds, and which is not soluble in water. The alkali metal alginates, such as sodium, lithium, potassium and ammonium are sufficiently soluble to render them undesirable. Suitable alginates are aluminum, beryllium, calcium, chromium, iron, strontium and zinc. We prefer calcium because of its ready availability, cheapness, ease of working, and satisfactory properties of the final product.

The alginic acid-alginate material may be prepared as follows: Gauze woven from calcium alginate is washed with dilute hydrochloric acid, of pH about 1.6 until the desired proportion of conversion to alginic acid has occurred, after which the gauze is washed in water to remove the acid. Thereafter the gauze is buffered to a pH of about 4 to stabilize the unconverted portion of the alginic acid, and dried. The buffering may be accomplished by dipping in potassium acid phthalate and then washing. This results in a long chain molecule in which calcium has replaced the hydrogen ion in some of the carboxyl groups and potassium has replaced the hydrogen ion in other carboxyl groups. This complex is insoluble in water, there being insufficient potassium present in the molecule to produce solubility. The result is a gauze which has not changed its physical form or absorbency, but is composed of the material described above, a combination of alginic acid and calcium alginate.

We have found that the proportion of conversion depends on the concentration of the acid. Equilibrium of the conversion appears to occur in about five minutes. The amount or proportion of conversion is determined by measuring the calcium content of the converted product. Pure calcium alginate contains about 10.38% calcium. We have found that when the calcium content of the converted alginic acid-alginate combination is greater than about 6%, the hemostatic action of the material is undesirably slow. The hemostatic quality increases with decreasing calcium content, until at zero calcium content, or pure alginic acid, the hemostatic action is greatest. However, material having a calcium content below about 2% begins to loose strength in a steam sterilizer, and materials with calcium contents materially below this are degraded, weak and easily friable after such treatment. Accordingly we prefer to immerse the calcium alginate gauze in hydrochloric acid for a time sufficient to give a calcium content between about 2% and about 6%, and even between about 3% and about 4.5%, since the hemostatic quality of the material having a calcium content higher than 4.5% may not be adequate for some uses.

Thus when the surgical dressings according to our invention are to be sterilized by methods other than exposure to steam, we may use either pure alginic acid, or alginic acid which has been only slightly converted into an alginate (for example, containing about 2% calcium). This is preferably buffered to a pH of about 4 to stabilize the material. But when steam sterilizable dressings are required, we prefer to form them of alginic acid-alginate combination which contains sufficient metal to stabilize the material to exposure to steam.

We claim as our invention:

1. A hemostatic surgical dressing comprising fibers consisting of a calcium alginate partially converted into alginic acid and containing from about 3% to about 4.5% calcium.

2. A hemostatic surgical dressing comprising fibers consisting of a calcium alginate partially converted into alginic acid and containing from about 2% to about 6% calcium.

JAMES J. EBERL.
WILLIAM L. GEORGE.

REFERENCES CITED

The following references are of record in the file of this patent:

UNITED STATES PATENTS

| Number | Name | Date |
|---|---|---|
| 2,268,347 | Steinberg | Dec. 30, 1941 |
| 2,371,717 | Speakman | Mar. 20, 1945 |
| 2,375,650 | Hegan et al. | May 8, 1945 |

FOREIGN PATENTS

| Number | Country | Date |
|---|---|---|
| 116,134 | Australia | Nov. 26, 1942 |

OTHER REFERENCES

J. Soc. Dyers and Col., Oct. 1944, pages 264 to 272.